United States Patent
Tsai et al.

(10) Patent No.: US 10,856,332 B2
(45) Date of Patent: Dec. 1, 2020

(54) METHOD AND APPARATUS FOR RANDOM ACCESS CHANNEL PROCEDURE IN WIRELESS COMMUNICATION SYSTEM

(71) Applicant: MEDIATEK INC., Hsin-Chu (TW)

(72) Inventors: Chiou-Wei Tsai, Hsin-Chu (TW); Xiu-Sheng Li, Hsin-Chu (TW); Chien-Hwa Hwang, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 7 days.

(21) Appl. No.: 16/016,005

(22) Filed: Jun. 22, 2018

(65) Prior Publication Data

US 2018/0376511 A1   Dec. 27, 2018

Related U.S. Application Data

(60) Provisional application No. 62/523,896, filed on Jun. 23, 2017.

(51) Int. Cl.
*H04W 74/08* (2009.01)
*H04W 72/04* (2009.01)
(Continued)

(52) U.S. Cl.
CPC ....... *H04W 74/0833* (2013.01); *H04L 5/0053* (2013.01); *H04W 36/0072* (2013.01); *H04W 36/0077* (2013.01); *H04W 72/042* (2013.01); *H04W 72/14* (2013.01); *H04L 5/0094* (2013.01); *H04W 48/12* (2013.01)

(58) Field of Classification Search
CPC ......... H04W 74/0833; H04W 36/0077; H04W 72/14; H04W 72/042; H04W 36/0072; H04L 5/0053
See application file for complete search history.

(56) References Cited

U.S. PATENT DOCUMENTS

| 2011/0021206 A1* | 1/2011 | Baker | H04W 88/08 455/450 |
| 2015/0304082 A1* | 10/2015 | Park | H04L 5/0048 370/329 |

(Continued)

FOREIGN PATENT DOCUMENTS

| CN | 103391617 A | 11/2013 |
| CN | 103873218 A | 6/2014 |
| WO | 2012/051911 A1 | 4/2012 |

OTHER PUBLICATIONS

"Discussion on configuration of search space and Coreset;" 3GPP TSG RAN WG1 #89; May 2017; pp. 1-3.

(Continued)

*Primary Examiner* — Christine Ng
(74) *Attorney, Agent, or Firm* — McClure, Qualey & Rodack, LLP

(57) ABSTRACT

A wireless communication method, base station, and user equipment (UE) for physical downlink control channel (PDCCH) in random access channel (RACH) procedure are provided. The UE may include a processor. The processor may obtains a first control resource set (CORESET) configuration for physical downlink control channels (PDCCHs) in the RACH procedure and obtaining a first search space configuration for the PDCCHs in the RACH procedure from a base station to monitor and receive the PDCCHs in the RACH procedure.

12 Claims, 7 Drawing Sheets

(51) Int. Cl.
  *H04W 36/00* (2009.01)
  *H04L 5/00* (2006.01)
  *H04W 72/14* (2009.01)
  *H04W 48/12* (2009.01)

(56) References Cited

U.S. PATENT DOCUMENTS

2018/0287762 A1* 10/2018 Sun .................. H04L 5/0005
2018/0288749 A1* 10/2018 Sun .................. H04W 72/042
2018/0324864 A1* 11/2018 Jung ................. H04W 24/10
2018/0368145 A1* 12/2018 Abdoli .............. H04L 5/00

OTHER PUBLICATIONS

"Overview of DL Control Channel Design;" 3GPP TSG-RAN WG1 Meeting#89; May 2017; pp. 1-9.

* cited by examiner

METHOD AND APPARATUS FOR RANDOM ACCESS CHANNEL PROCEDURE IN WIRELESS COMMUNICATION SYSTEM

CROSS REFERENCE TO RELATED APPLICATIONS

This Application claims priority of U.S. Provisional Patent Application No. 62/523,896, filed on Jun. 23, 2017, the entirety of which is incorporated by reference herein.

BACKGROUND OF THE INVENTION

Field of the Invention

The invention generally relates to a wireless communication technology, and more particularly, to the control resource set (CORESET) configuration and the search space configuration for physical downlink control channel (PDCCH) in random access channel (RACH) procedure.

Description of the Related Art

The fifth generation (5G) radio access technology, e.g. New Radio (NR) version, will be a key component of modern access networks. It will address high traffic growth and increasing demand for high-bandwidth connectivity. It will also support massive numbers of connected devices and meet the real-time, high-reliability communication needs of mission-critical applications.

The 3rd Generation Partnership Project (3GPP) has approved plans to speed up the development of the 5G standards. However, in the current standards, the control resource set (CORESET) configuration and the search space configuration for physical downlink control channels (PDCCHs) in the random access channel (RACH) procedure have not been provided.

BRIEF SUMMARY OF THE INVENTION

A wireless communication method, user equipment, and base station for the random access channel (RACH) procedure are provided to overcome the problems mentioned above.

An embodiment of the invention provides a wireless communication method for user equipment (UE) in a random access (RACH) procedure. The wireless communication method comprises the step of obtaining a first control resource set (CORESET) configuration for physical downlink control channels (PDCCHs) in a random access channel (RACH) procedure and obtaining a first search space configuration for the PDCCHs in the RACH procedure from a base station to monitor and receive the PDCCHs in the RACH procedure.

An embodiment of the invention provides a base station for a random access (RACH) procedure. The base station comprises a transmitter. The transmitter provides a control resource set (CORESET) configuration and a search space configuration to a user equipment (UE) to transmit physical downlink control channels (PDCCHs) in the RACH procedure.

An embodiment of the invention provides user equipment (UE) for a random access (RACH) procedure. The UE may comprise a processor. The processor obtains a first control resource set (CORESET) configuration for physical downlink control channels (PDCCHs) in the RACH procedure and obtaining a first search space configuration for the PDCCHs in the RACH procedure from a base station to monitor and receive the PDCCHs in the RACH procedure.

In some embodiments of the invention, the processor obtains the first CORESET configuration through the higher layer signaling carried by RMSI. In some embodiments of the invention, the processor obtains the first CORESET configuration through the higher layer signaling carried by a handover command which provides required information and configurations for the UE to handover from a serving cell to a target cell.

In some embodiments of the invention, if the first CORESET configuration is not provided through higher layer signaling, the processor determines that the first CORESET configuration is the same as a second CORESET configuration, wherein the second CORESET configuration is utilized to schedule remaining minimum system information (RMSI).

In some embodiments of the invention, the processor obtains the first search space configuration through higher layer signaling.

In some embodiments of the invention, if the first search space configuration is not provided through higher layer signaling, the processor determines the first search space configuration according to a part of a second search space configuration, wherein the second search space configuration is utilized to schedule RMSI. In some embodiments of the invention, the processor determines that the first search space configuration is the same as the second search space configuration.

Other aspects and features of the invention will become apparent to those with ordinary skill in the art upon review of the following descriptions of specific embodiments of wireless communication methods, user equipment and the base station.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
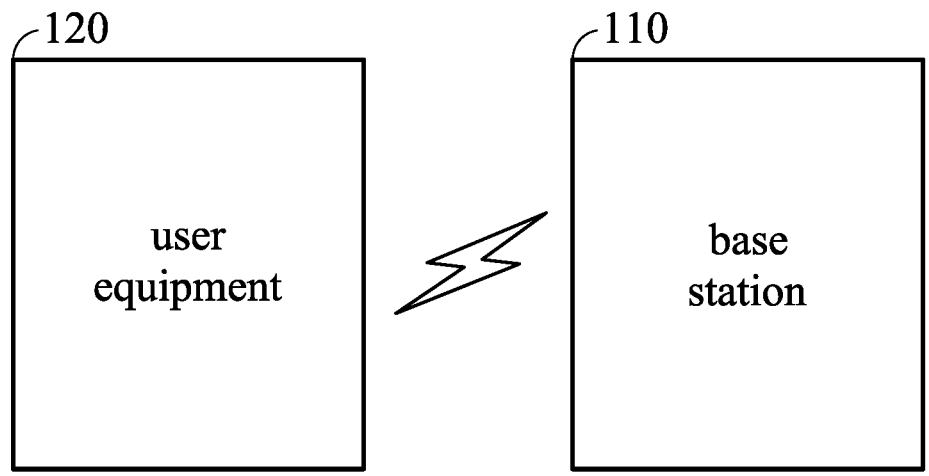
FIG. 1 is a block diagram of a wireless communication system 100 according to an embodiment of the invention.

FIG. 1 is a block diagram of a wireless communication system 100 according to an embodiment of the invention. The wireless communication system 100 comprises a base station 110 and user equipment (UE) 120. Note that, in order to clarify the concept of the invention, FIG. 1 is a simplified block diagram in which only the elements relevant to the invention are shown. However, the invention should not be limited to what is shown in FIG. 1.

In the embodiments of the invention, the base station 110 may be a base transceiver station (BTS), a NodeB, an evolved NodeB (eNB), a next generation NodeB (gNB), a radio access point (RAN) node, and so on. In the embodiments of the invention, the UE 120 may be a smartphone, Personal Data Assistant (PDA), pager, laptop computer, desktop computer, wireless handset, or any computing device that includes a wireless communications interface.

In the embodiments of the invention, the base station 110 may communicate with the UE 120 through the fifth generation (5G) New Radio (NR) radio access technology.

Figure 2:
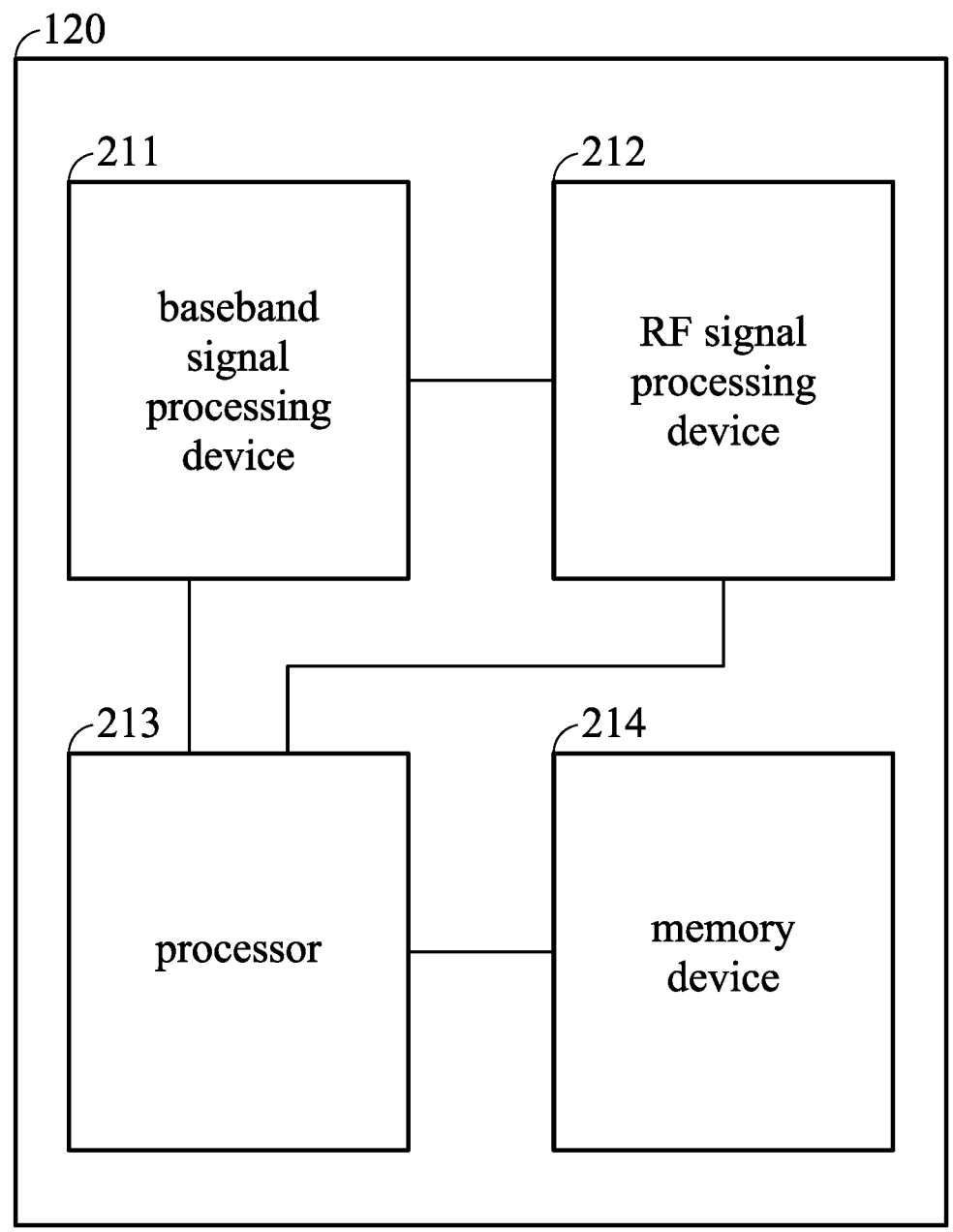
FIG. 2 is a block diagram of the UE 120 according to an embodiment of the invention.

FIG. 2 is a block diagram of the UE 120 according to an embodiment of the invention. As shown in FIG. 2, the UE 120 may comprise at least a baseband signal processing device 211, an RF signal processing device 212, a processor 213, a memory device 214, and an antenna module comprising at least one antenna. Note that, in order to clarify the concept of the invention, FIG. 2 presents a simplified block diagram in which only the elements relevant to the invention are shown. However, the invention should not be limited to what is shown in FIG. 2.

The RF signal processing device 212 may receive RF signals via the antenna and process the received RF signals to convert the received RF signals to baseband signals to be processed by the baseband signal processing device 211, or receive baseband signals from the baseband signal processing device 211 and convert the received baseband signals to RF signals to be transmitted to a peer communications apparatus. The RF signal processing device 212 may comprise a plurality of hardware elements to perform radio frequency conversion. For example, the RF signal processing device 212 may comprise a power amplifier, a mixer, analog-to-digital converter (ADC)/digital-to-analog converter (DAC), etc.

The baseband signal processing device 211 may further process the baseband signals to obtain information or data transmitted by the peer communications apparatus. The baseband signal processing device 211 may also comprise a plurality of hardware elements to perform baseband signal processing.

The processor 213 may control the operations of the baseband signal processing device 211 and the RF signal processing device 212. According to an embodiment of the invention, the processor 213 may also be arranged to execute the program codes of the software module(s) of the corresponding baseband signal processing device 211 and/or the RF signal processing device 212. The program codes accompanied by specific data in a data structure may also be referred to as a processor logic unit or a stack instance when being executed. Therefore, the processor 213 may be regarded as being comprised of a plurality of processor logic units, each for executing one or more specific functions or tasks of the corresponding software module(s).

The memory device 214 may store the software and firmware program codes, system data, user data, etc. of the UE 120. The memory device 214 may be a volatile memory such as a Random Access Memory (RAM); a non-volatile memory such as a flash memory or Read-Only Memory (ROM); a hard disk; or any combination thereof.

According to an embodiment of the invention, the RF signal processing device 212 and the baseband signal processing device 211 may collectively be regarded as a radio module capable of communicating with a wireless network to provide wireless communications services in compliance with a predetermined Radio Access Technology (RAT). Note that, in some embodiments of the invention, the UE 120 may be extended further to comprise more than one antenna and/or more than one radio module, and the invention should not be limited to what is shown in FIG. 2.

In addition, in some embodiments of the invention, the processor 213 may be configured inside of the baseband signal processing device 211, or the UE 120 may comprise another processor configured inside of the baseband signal processing device 211. Thus the invention should not be limited to the architecture shown in FIG. 2.

In the embodiments of the invention, the base station 110 may provide a control resource set (CORESET) configuration and a search space configuration to the UE 120 by its transmitter (not shown in figures) to monitor and receive physical downlink control channels (PDCCHs) in the RACH procedure. Details are discussed further in the embodiments below.

In an embodiment of the invention, the CORESET configuration may indicate the related information of the CORESET, e.g. the frequency location and the size of the CORESET in terms of number of physical resource blocks (PRBs) and number of OFDM symbols. Specifically, the UE 120 may obtain the frequency-dimension configuration of the physical downlink control channel (PDCCH) from the CORESET configuration, e.g. the number of physical resource blocks (PRBs) and the location where the CORESET is located in the frequency domain, and the number of OFDM symbols in the CORESET. The CORESET is a time-frequency resource. The downlink control information (DCI) is carried by the PDCCH. In the embodiments of the invention, in the random access (RACH) procedure, the PDCCHs are used to transmit DCIs for the scheduling of a random access response (RAR), also known as Msg2, Msg3 retransmission grant, and for scheduling of Msg4. Furthermore, the Cyclic Redundancy Check (CRC) of the PDCCH for Msg2 is scrambled by a random access-Radio Network Temporary Identifier (RA-RNTI), the CRC of the PDCCH for Msg3 is scrambled by a Temporary Cell-RNTI (TC-RNTI), and the CRC of the PDCCH for Msg4 is scrambled by the TC-RNTI or a Cell-RNTI (C-RNTI).

In an embodiment of the invention, the search space configuration may indicate the related information of a CORESET corresponding to a search space, e.g. where the CORESET is located within a slot and how often the CORESET occurs. Specifically, the UE 120 may obtain the time-dimension configuration of the PDCCH from the search space configuration, e.g. the occasion periodicity and the starting symbol of the CORESET corresponding to the search space within a slot. In the embodiments of the invention, the search space can be a common search space or a UE-specific search space. The UE may monitor the PDCCH candidate in the search space.

In an embodiment of the invention, a CORESET configuration for PDCCHs in a RACH procedure (indicated as the first CORESET configuration below) is provided to the UE 120 through a higher layer signaling, e.g. Radio Resource Control (RRC) signaling carried by the remaining minimum system information (RMSI). Namely, when UE 120 reads the RMSI, there is a first CORESET configuration specified for the PDCCHs in the RACH procedure, the UE 120 may use the first CORESET configuration from the higher layer signaling for the PDCCHs in the RACH procedure. In another embodiment, the UE 120 may obtain the first CORESET configuration for the PDCCHs in the RACH procedure through the higher layer signaling carried by a handover command which provides required information and configurations for the UE 120 to handover from a serving cell to a target cell.

In another embodiment of the invention, a CORESET configuration for PDCCHs scheduling RMSI (indicated as the second CORESET configuration which is used to schedule the RMSI) is provided to the UE 120 through a major system information block (MIB). Specifically, the RF signal processing device 212 of the UE 120 may receive the Signal/Physical Broadcast Channel (SS/PBCH) block (SSB) from the base station 110. Then, the processor 213 of the UE 120 may obtain the MIB from the SSB, which is provided by the base station 110. The SSB may comprise Primary Synchronization Signal (PSS), Secondary Synchronization Signal (SSS) and Physical Broadcast Channel (PBCH). The MIB is carried on the PBCH. Therefore, the UE 120 may obtain the MIB from the SSB. After obtaining the MIB, the UE 120 may decode the MIB to obtain the second CORESET configuration which is used to schedule the RMSI. The UE 120 may read RMSI to determine whether the first CORESET configuration for the PDCCHs in a RACH procedure is provided to the UE 120 through the higher layer signaling. If the first CORESET configuration for the RACH procedure is not provided to the UE 120 through the higher layer signaling carried in the RMSI (i.e. when the UE 120 reads the RMSI, there is no first CORESET configuration specified for the PDCCHs in the RACH procedure), the UE 120 may determine the first CORESET configuration for the PDCCHs in the RACH procedure is the same as the second CORESET configuration. Namely, the UE 120 may use the second CORESET configuration in the RACH procedure.

In an embodiment of the invention, a search space configuration for PDCCHs in a RACH procedure (indicated as the first search space configuration below) is provided to the UE 120 through a higher layer signaling, e.g. RRC signaling carried by RMSI. Namely, when UE 120 reads the RMSI, there is a first search space configuration specified for the PDCCHs in the RACH procedure, the UE 120 may use the first search space configuration from the higher layer signaling for the PDCCHs in the RACH procedure. In another embodiment, the UE 120 may obtain the first search space configuration for the PDCCHs in the RACH procedure through the higher layer signaling carried by a handover command which provides required information and configurations for the UE 120 to handover from a serving cell to a target cell.

In another embodiment of the invention, a search space configuration for PDCCHs scheduling RMSI (indicated as the second search space configuration which is used to schedule the RMSI) is provided to the UE 120 through a MIB. Specifically, the RF signal processing device 212 of the UE 120 may obtain the MIB from the SSB which is provided by the base station 110, and then the processor 213 of the UE 120 may decode the MIB to obtain the second search space configuration which is used to schedule the RMSI. The UE 120 may read RMSI to determine whether the first search space configuration for the PDCCHs in the RACH procedure is provided to the UE 120 through the higher layer signaling. If the first search space configuration for the PDCCHs in the RACH procedure is not provided to the UE 120 through the higher layer signaling (i.e. when the UE 120 reads the RMSI, there is no first search space configuration specified for the PDCCHs in the RACH procedure), the UE 120 may determine the first search space configuration for the PDCCHs in the RACH procedure according to the second search space configuration.

In an embodiment of the invention, if the first search space configuration for the PDCCHs in the RACH procedure is not provided to the UE 120 through the higher layer signaling (i.e. when the UE 120 reads the RMSI, there is no first search space configuration specified for the PDCCHs in the RACH procedure), the UE 120 may determine that the first search space configuration for the PDCCHs in the RACH procedure is the same as the second search space configuration.

In another embodiment of the invention, if the first search space configuration for the PDCCHs in the RACH procedure is not provided to the UE 120 through the higher layer signaling (i.e. when the UE 120 reads the RMSI, there is no first search space configuration specified for the PDCCHs in the RACH procedure), the UE 120 may determine the first search space configuration for the PDCCHs in the RACH procedure according to the second search space configuration and a defined rule (e.g. the period and/or the association between SSBs and search spaces for RACH). In another embodiment of the invention, if the first search space configuration for the PDCCHs in the RACH procedure is not provided to the UE 120 through the higher layer signaling (i.e. when the UE 120 reads the RMSI, there is no first search space configuration specified for the PDCCHs in the RACH procedure), the UE 120 may determine the first search space configuration for the PDCCHs in the RACH procedure according to the second search space configuration and the parameters configured in the RMSI (e.g. control-channel element (CCE) index, Aggregation Level, scrambling code (e.g. RNTI), etc.).

In another embodiment of the invention, if the first search space configuration for the PDCCHs in the RACH procedure is not provided to the UE 120 through the higher layer signaling (i.e. when the UE 120 reads the RMSI, there is no first search space configuration specified for the PDCCHs in the RACH procedure), the UE 120 may search the first search space configuration for the PDCCHs in the RACH procedure according to a defined search space configuration.

In another embodiment of the invention, if the first search space configuration for the PDCCHs in the RACH procedure is not provided to the UE 120 through the higher layer signaling (i.e. when the UE 120 reads the RMSI, there is no first search space configuration specified for the PDCCHs in the RACH procedure), the UE 120 may determines the first search space configuration for the PDCCHs in the RACH procedure according to a defined rule (e.g. the period and/or the association between SSBs and search spaces for RACH) and the parameters configured in the RMSI.

Accordingly, according to the above embodiments of the invention, there are four situations for the CORESET configuration and the search space configuration. In the first situation, the UE 120 may use the second CORESET configuration carried in MIB for scheduling the RMSI and use the second search space configuration carried in MIB for scheduling the RMSI. In the second situation, the UE 120 may use the second CORESET configuration carried in the MIB for scheduling the RMSI and use the first search space configuration from a higher layer signaling. In the third situation, the UE 120 may use the first CORESET configuration from a higher layer signaling and use the second search space configuration carried by the MIB for scheduling the RMSI. In the fourth situation, the UE 120 may use the first CORESET configuration from a higher layer signaling and use the first search space configuration from a higher layer signaling. When the UE 120 obtains the CORESET configuration and the search space configuration for the PDCCHs in the RACH procedure, the UE 120 may monitor and receive PDCCHs in the RACH procedure according to the CORESET configuration and the search space configuration.

Figure 3:
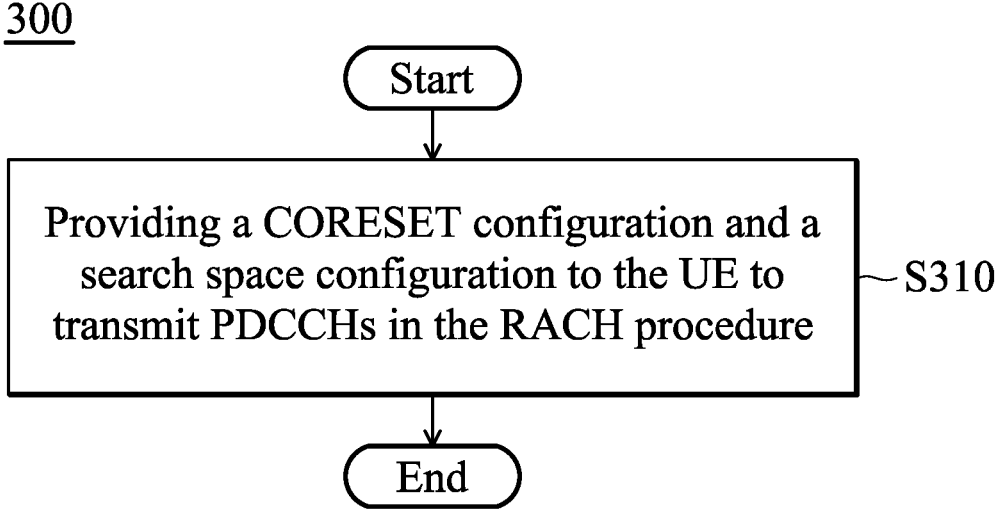
FIG. 3 is a flow chart 300 illustrating a wireless communication method for a base station in the RACH procedure according to an embodiment of the invention.

FIG. 3 is a flow chart 300 illustrating a wireless communication method for a base station in the RACH procedure according to an embodiment of the invention. The communication method can be applied to the base station 110 in a RACH procedure. In step S310, the base station 110 provides a control resource set (CORESET) configuration (e.g. first or second CORESET configuration) and a search space configuration (e.g. first or second search space configuration) to the UE 120 to transmit physical downlink control channels (PDCCHs) in the RACH procedure. The CORESET configuration and the search space configuration make the UE 120 be able to monitor and receive PDCCHs in the RACH procedure.

In an embodiment of the invention, in the communication method of flow chart 300, the CORESET configuration (i.e. first CORESET configuration) for the PDCCHs in the RACH procedure is provided to the UE 120 through higher layer signaling.

In another embodiment of the invention, in the communication method of flow chart 300, the CORESET configuration (i.e. second CORESET configuration) for scheduling RMSI is provided to the UE 120 through a MIB. In the embodiment, if the first CORESET configuration procedure for the PDCCHs in the RACH procedure is not provided through the higher layer signaling, the first CORESET configuration for the PDCCHs in the RACH procedure is the same as the second CORESET configuration for scheduling the RMSI.

In an embodiment of the invention, in the communication method of flow chart 300, the search space configuration (i.e. first search space configuration) for the PDCCHs in the RACH procedure is provided to the UE 120 through higher layer signaling carried by RMSI.

In another embodiment of the invention, in the communication method of flow chart 300, the search space configuration (i.e. second search space configuration for scheduling the RMSI is provided to the UE 120 through a MIB. If the first search space configuration for the PDCCHs in the RACH procedure is not provided through the higher layer signaling, the UE 120 may determine the first search space configuration for the PDCCHs in the RACH procedure according to the second search space configuration.

Figure 4:
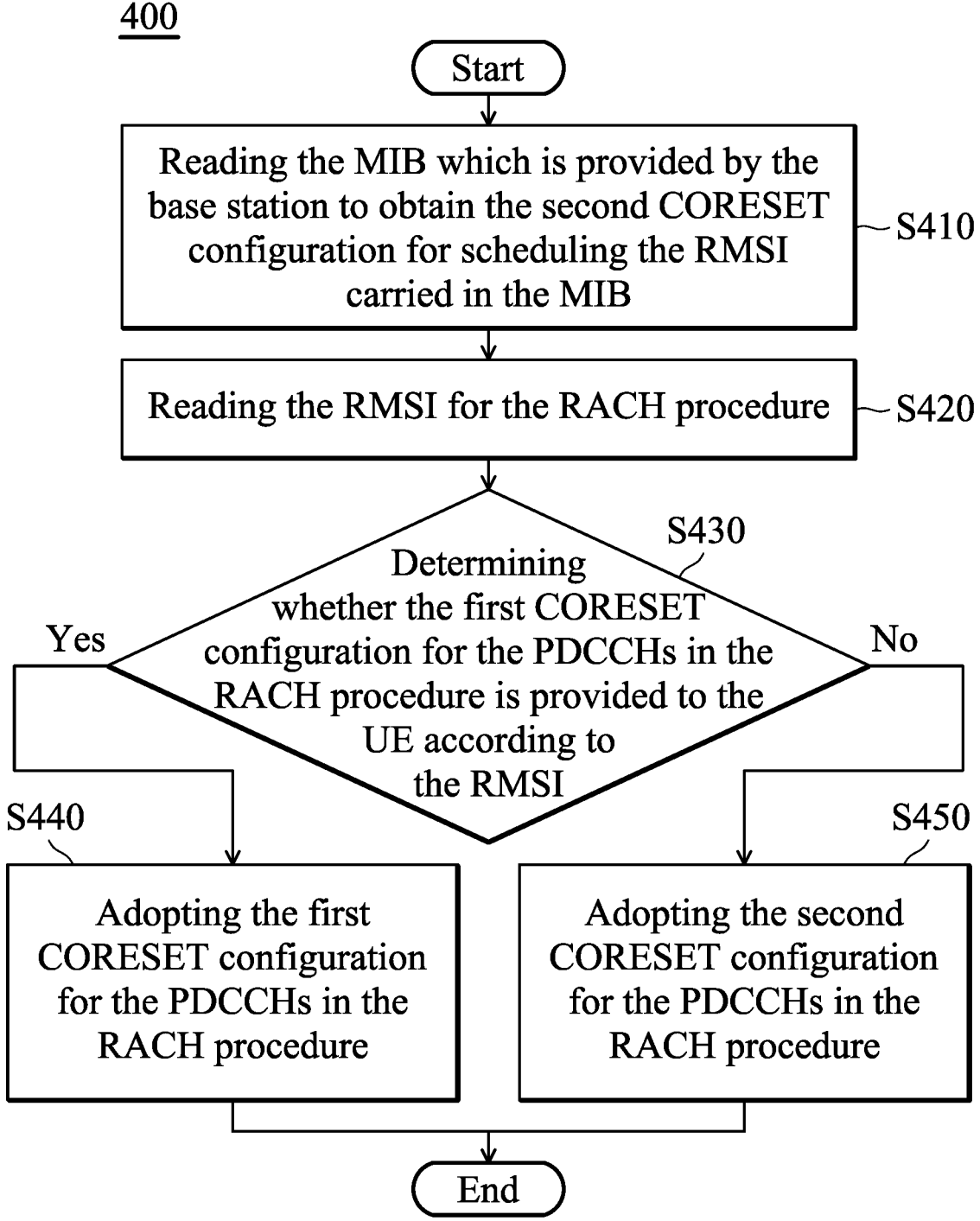
FIG. 4 is a flow chart 400 illustrating a wireless communication method for a UE in the RACH procedure according to an embodiment of the invention.

FIG. 4 is a flow chart 400 illustrating a wireless communication method for a UE in the RACH procedure according to an embodiment of the invention. The communication method can be applied to the UE 120 in a RACH procedure. In step S410, the UE 120 reads the MIB which is provided by the base station 110 to obtain the second CORESET configuration for scheduling the RMSI carried in the MIB. In step S420, the UE 120 reads the RMSI for the RACH procedure. In step S430, the UE 120 determine whether the first CORESET configuration for the PDCCHs in the RACH procedure is provided to the UE 120 according to the RMSI (i.e. determine whether the CORESET configuration for the RACH procedure is provided to the UE 120 through the higher layer signaling). If the first CORESET configuration for the PDCCHs in the RACH procedure is carried in the RMSI, step S440 is performed. In step S440, the UE 120 adopts the first CORESET configuration for the PDCCHs in the RACH procedure. If the first CORESET configuration for the PDCCHs in the RACH procedure is not carried in the RMSI, step S450 is performed. In step S450, the UE 120 adopts the second CORESET configuration for the PDCCHs in the RACH procedure. In another embodiment, the UE 120 may obtain the first CORESET configuration for the PDCCHs in the RACH procedure through the higher layer signaling carried by a handover command which provides required information and configurations for the UE 120 to handover from a serving cell to a target cell.

Figure 5:
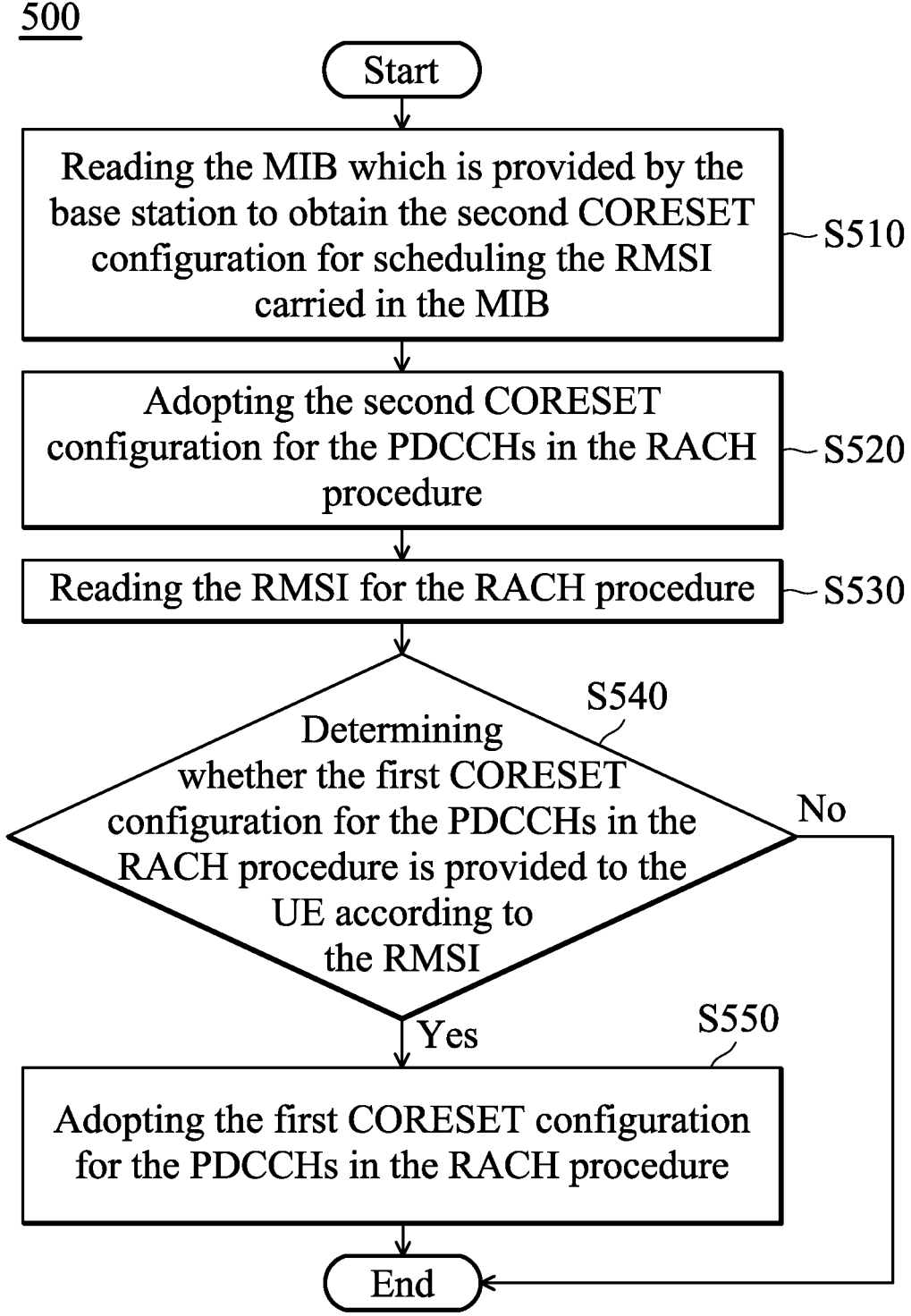
FIG. 5 is a flow chart 500 illustrating a wireless communication method for a UE in the RACH procedure according to another embodiment of the invention.

FIG. 5 is a flow chart 500 illustrating a wireless communication method for a UE in the RACH procedure according to another embodiment of the invention. The communication method can be applied to the UE 120 in a RACH procedure. In step S510, the UE 120 reads the MIB which is provided by the base station 110 to obtain the second CORESET configuration for scheduling the RMSI carried in the MIB. In step S520, the UE 120 adopts the second CORESET configuration for the PDCCHs in the RACH procedure first. In step S530, the UE 120 reads the RMSI for the RACH procedure. In step S540, the UE 120 determine whether the first CORESET configuration for the PDCCHs in the RACH procedure is provided to the UE 120 according to the RMSI (i.e. determine whether the first CORESET configuration for the PDCCHs in the RACH procedure is provided to the UE 120 through the higher layer signaling). If the first CORESET configuration for the PDCCHs in the RACH procedure is carried in the RMSI, step S550 is performed. In step S550, the UE 120 adopts the first CORESET configuration for the PDCCHs in the RACH procedure. If the first CORESET configuration for the PDCCHs in the RACH procedure is not carried in the RMSI, the UE 120 still adopts the second CORESET configuration for the PDCCHs in the RACH procedure. In another embodiment, the UE 120 may obtain the first CORESET configuration for the PDCCHs in the RACH procedure through the higher layer signaling carried by a handover command which provides required information and configurations for the UE 120 to handover from a serving cell to a target cell.

Figure 6:
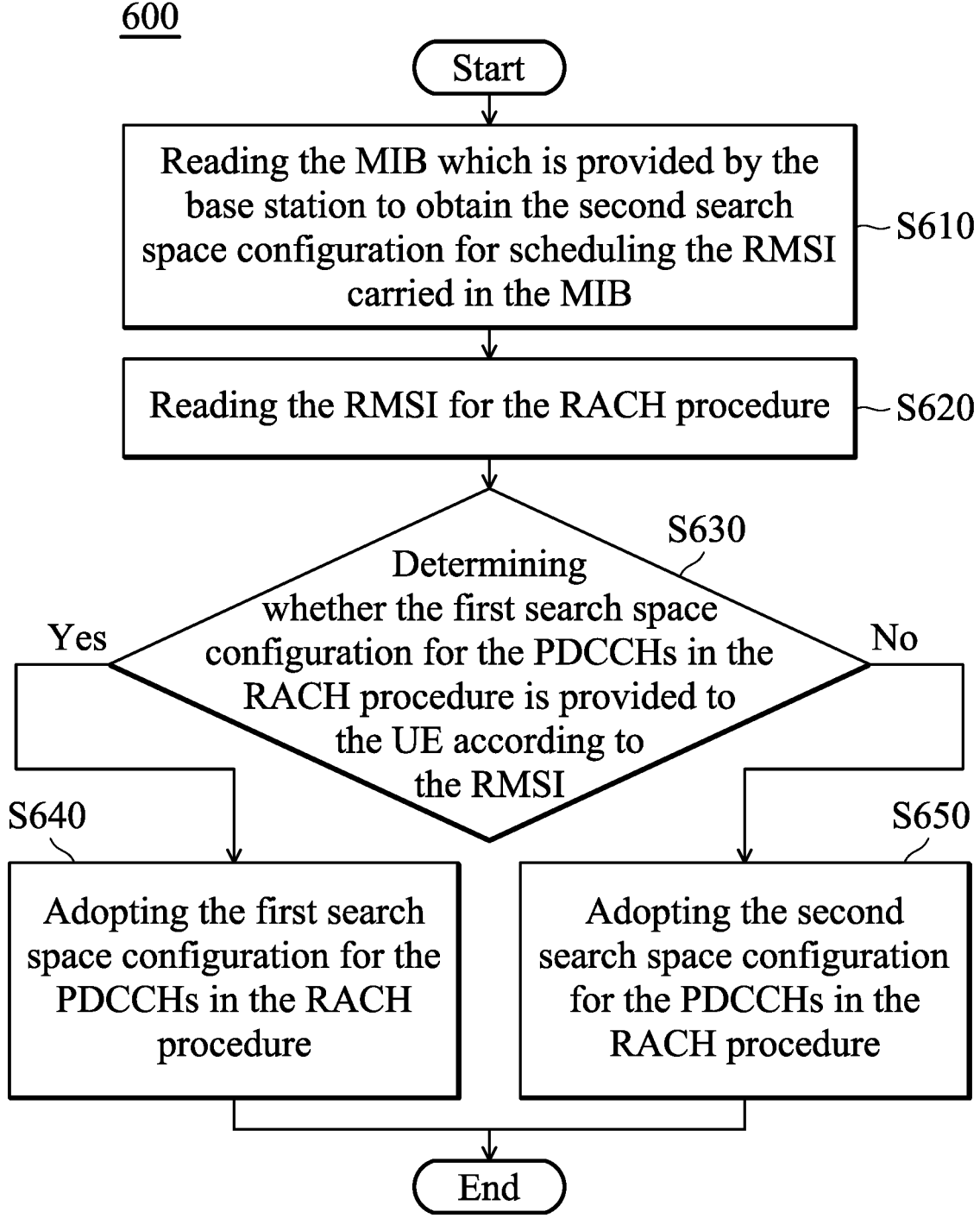
FIG. 6 is a flow chart 600 illustrating a wireless communication method for a UE in the RACH procedure according to another embodiment of the invention.

FIG. 6 is a flow chart 600 illustrating a wireless communication method for a UE in the RACH procedure according to another embodiment of the invention. The communication method can be applied to the UE 120 in a RACH procedure. In step S610, the UE 120 reads the MIB which is provided by the base station 110 to obtain the second search space configuration for scheduling the RMSI carried in the MIB. In step S620, the UE 120 reads the RMSI for the RACH procedure. In step S630, the UE 120 determines whether the first search space configuration for the PDCCHs in the RACH procedure is provided to the UE 120 according to the RMSI (i.e. determine whether the first search space configuration for the PDCCHs in the RACH procedure is provided to the UE 120 through the higher layer signaling). If the first search space configuration for the PDCCHs in the RACH procedure is carried in the RMSI, step S640 is performed. In step S640, the UE 120 adopts the first search space configuration for the PDCCHs in the RACH procedure. If the first search space configuration for the PDCCHs in the RACH procedure is not carried in the RMSI, step S650 is performed. In step S650, the UE 120 adopts the second search space configuration for the PDCCHs in the RMSI. In another embodiment, the UE 120 may obtain the first search space configuration for the PDCCHs in the RACH procedure through the higher layer signaling carried by a handover command which provides required information and configurations for the UE 120 to handover from a serving cell to a target cell.

Figure 7:
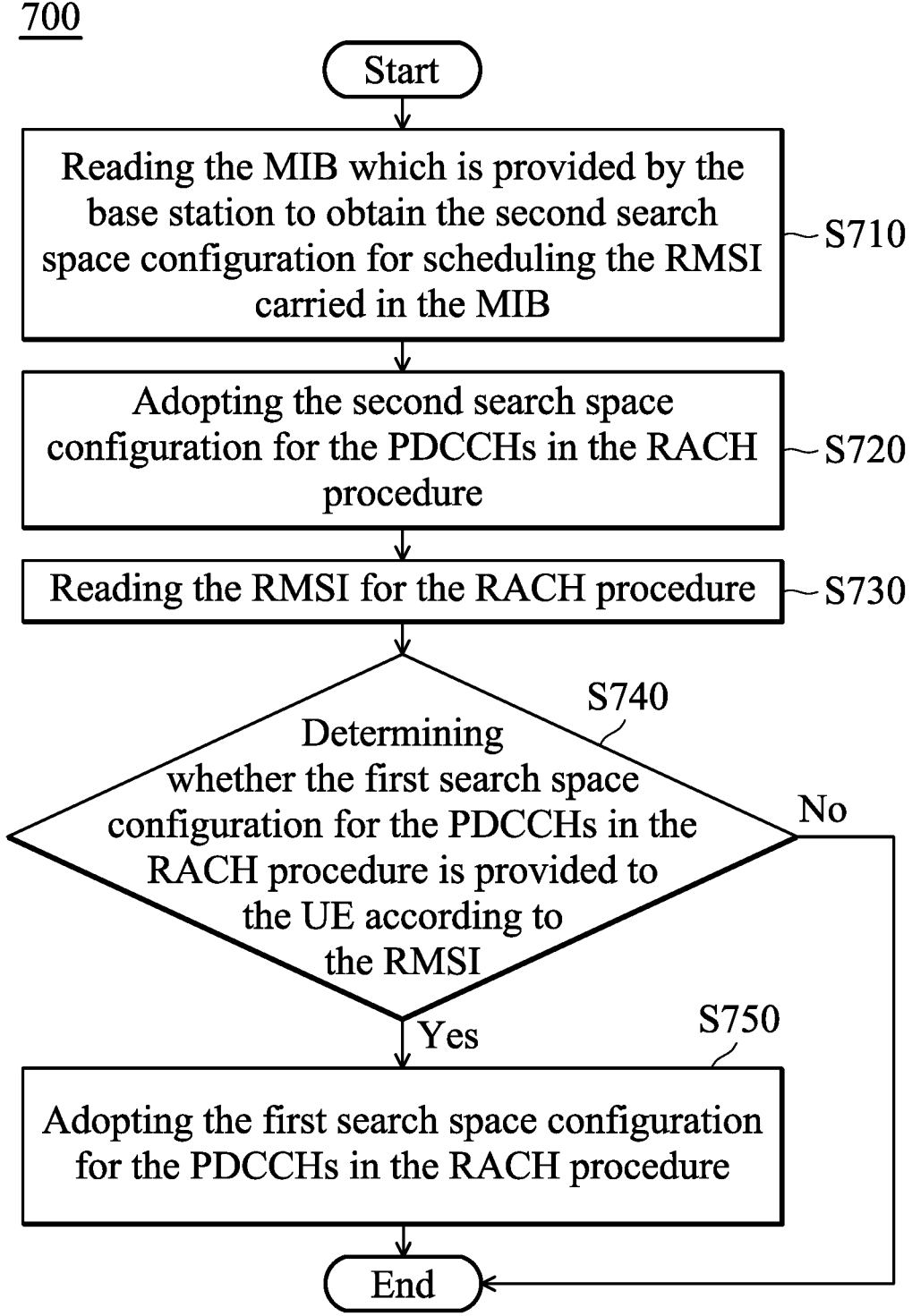
FIG. 7 is a flow chart 700 illustrating a wireless communication method for a UE in the RACH procedure according to another embodiment of the invention.

FIG. 7 is a flow chart 700 illustrating a wireless communication method for a UE in the RACH procedure according to another embodiment of the invention. The communication method can be applied to the UE 120 in a RACH procedure. In step S710, the UE 120 reads the MIB which is provided by the base station 110 to obtain the second search space configuration for scheduling the RMSI carried in the MIB. In step S720, the UE 120 adopts the second search space configuration for the PDCCHs in the RACH procedure first. In step S730, the UE 120 reads the RMSI for the RACH procedure. In step S740, the UE 120 determines whether the first search space configuration for the PDCCHs in the RACH procedure is provided to the UE 120 according to the RMSI (i.e. determine whether the first search space configuration for the PDCCHs in the RACH procedure is provided to the UE 120 through the higher layer signaling). If the first search space configuration for the PDCCHs in the RACH procedure is carried in the RMSI, step S750 is performed. In step S750, the UE 120 adopts the first search space configuration for the PDCCHs in the RACH procedure. If the first search space configuration for the PDCCHs in the RACH procedure is not carried in the RMSI, the UE 120 still adopts the second search space configuration for the PDCCHs in in the RACH procedure. In another embodiment, the UE 120 may obtain the first search space configuration for the PDCCHs in the RACH procedure through the higher layer signaling carried by a handover command which provides required information and configurations for the UE 120 to handover from a serving cell to a target cell.

In an embodiment of the invention, in the communication methods of flow charts 600 and 700, if the first CORESET configuration for the PDCCHs in the RACH procedure is not provided to the UE 120 according to the RMSI (i.e. the first CORESET configuration for the PDCCHs in the RACH procedure is not provided through the higher layer signaling), the UE 120 may determine that the first CORESET configuration is the same as a second CORESET configuration for PDCCHs.

In an embodiment of the invention, in the communication methods of flow charts 600 and 700, if the first search space configuration for the PDCCHs in the RACH procedure is not provided to the UE 120 according to the RMSI (i.e. the first search space configuration for the PDCCHs in the RACH procedure is not provided through the higher layer signaling), the UE 120 may further determines that the first search space configuration for the PDCCHs in the RACH procedure is the same as the second search space configuration.

In another embodiment of the invention, in the communication methods of flow charts 600 and 700, if the first search space configuration for the PDCCHs in the RACH procedure is not provided to the UE 120 according to the RMSI (i.e. the first search space configuration for the PDCCHs in the RACH procedure is not provided through the higher layer signaling), the UE 120 may determine the first search space configuration according to a part of a second search space configuration.

In another embodiment of the invention, in the communication methods of flow charts 600 and 700, if the first search space configuration for the PDCCHs in the RACH procedure is not provided to the UE 120 according to the RMSI (i.e. the first search space configuration for the PDCCHs in the RACH procedure is not provided through the higher layer signaling), the UE 120 may determine the first search space configuration according to at least one defined rule and a part of a second search space configuration.

In another embodiment of the invention, in the communication methods of flow charts 600 and 700, if the first search space configuration for the PDCCHs in the RACH procedure is not provided to the UE 120 according to the RMSI (i.e. the first search space configuration for the PDCCHs in the RACH procedure is not provided through the higher layer signaling), the UE 120 may determine the first search space configuration according to at least a part of a second search space configuration, and a parameter configured in the RMSI.

In another embodiment of the invention, in the communication methods of flow charts 600 and 700, if the first search space configuration for the PDCCHs in the RACH procedure is not provided to the UE 120 according to in the RMSI (i.e. the first search space configuration for the PDCCHs in the RACH procedure is not provided through the higher layer signaling), the UE 120 searches the first search space configuration according to a defined search space configuration.

Accordingly, in the wireless communication methods of the invention, the UE can obtain the CORESET configuration and the search space configuration through the MIB and/or RMSI for the PDCCHs in RACH procedure.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A wireless communication method for user equipment (UE), comprising:
   obtaining, by the UE, a first search space configuration provided by a base station through a higher layer signaling to monitor and receive physical downlink control channels (PDCCHs) in a random access channel (RACH) procedure, wherein the first search space configuration is configured for the PDCCHs in the RACH,
   wherein if the first search space configuration is not provided through higher layer signaling, the first search space configuration is determined according to a second search space configuration or a part of the second search space configuration, wherein the second search space configuration is utilized to schedule remaining minimum system information (RMSI).

2. The wireless communication method of claim 1, further comprising:
   obtaining, by the UE, a first control resource set (CORESET) configuration provided by the base station through the higher layer signaling.

3. The wireless communication method of claim 1, wherein if a first CORESET configuration is not provided through higher layer signaling, the first CORESET configuration is determined the same as a second CORESET configuration, wherein the second CORESET configuration is utilized to schedule the RMSI.

4. The wireless communication method of claim 1, wherein the first search space configuration is determined the same as the second search space configuration.

5. The wireless communication method of claim 1, wherein if the first search space configuration is not provided through higher layer signaling, other than the second search space configuration or the part of the second search space configuration, a defined rule is additionally referred within the determination of the first search space configuration.

6. The wireless communication method of claim 1, wherein if the first search space configuration is not provided through higher layer signaling, other than the second search space configuration or the part of the second search space configuration, a parameter configured in the RMSI is additionally referred within the determination of the first search space configuration.

7. A user equipment (UE) for a random access channel (RACH) procedure, comprising:
   a processor, obtaining a first search space configuration provided by a base station through a higher layer signaling to monitor and receive physical downlink control channels (PDCCHs) in the RACH procedure, wherein the first search space configuration is configured for the PDCCHs in the RACH,
   wherein if the first search space configuration is not provided through higher layer signaling, the first search space configuration is determined according to a second search space configuration or a part of the second search space configuration, wherein the second search space configuration is utilized to schedule remaining minimum system information (RMSI).

8. The UE of claim 7, wherein the processor further obtains a first control resource set (CORESET) configuration provided by the base station through the higher layer signaling.

9. The UE of claim 7, wherein if a first CORESET configuration is not provided through higher layer signaling, the processor determines that the first CORESET configuration is the same as a second CORESET configuration, wherein the second CORESET configuration is utilized to schedule the RMSI.

10. The UE of claim 7, wherein the processor determines that the first search space configuration is the same as the second search space configuration.

11. The UE of claim 7, wherein if the first search space configuration is not provided through higher layer signaling, the processor determines the first search space configuration further according to a defined rule other than the second search space configuration or the part of the second search space configuration.

12. The communication method of claim 7, wherein if the first search space configuration is not provided through higher layer signaling, the processor determines the first search space configuration further according to a parameter configured in the RMSI other than the second search space configuration or the part of the second search space configuration.

* * * * *